United States Patent
Fisch

(10) Patent No.: US 12,158,217 B2
(45) Date of Patent: Dec. 3, 2024

(54) FLUID VALVE

(71) Applicant: AVS, Ingenieur J.C. Römer GmbH, Grafenau (DE)

(72) Inventor: Rainer Fisch, Hauzenberg (DE)

(73) Assignee: AVS, Ingenieur J.C. Römer GmbH, Grafenau (DE)

( * ) Notice: Subject to any disclaimer, the term of this patent is extended or adjusted under 35 U.S.C. 154(b) by 89 days.

(21) Appl. No.: 18/145,758

(22) Filed: Dec. 22, 2022

(65) Prior Publication Data

US 2023/0204121 A1     Jun. 29, 2023

(30) Foreign Application Priority Data

Dec. 23, 2021   (EP) ...................................... 21217231

(51) Int. Cl.
   *F16K 31/06*          (2006.01)
(52) U.S. Cl.
   CPC ...... *F16K 31/0682* (2013.01); *F16K 31/0675* (2013.01); *F16K 2200/3051* (2021.08); *F16K 2200/3052* (2021.08)
(58) Field of Classification Search
   CPC .. F16K 27/029; F16K 27/048; F16K 31/0603; F16K 31/0627; F16K 31/0675; F16K 31/0682; F16K 2022/3051; F16K 2022/3052
   See application file for complete search history.

(56) References Cited

U.S. PATENT DOCUMENTS

| | | | | |
|---|---|---|---|---|
| 5,040,567 | A * | 8/1991 | Nestler | F16K 31/0682 251/129.16 |
| 8,757,588 | B2 * | 6/2014 | Scheibe | F16K 31/0658 251/129.16 |
| 9,631,737 | B2 * | 4/2017 | Brust | F16K 31/0682 |
| 10,024,448 | B2 * | 7/2018 | Watanabe | H01F 27/24 |
| 10,221,957 | B2 * | 3/2019 | Ohta | F16K 11/04 |
| 10,288,187 | B2 * | 5/2019 | Vogt | F16K 31/0679 |
| 10,522,278 | B2 * | 12/2019 | Beuschel | H01F 7/12 |
| 10,711,914 | B2 * | 7/2020 | Roether | F16K 1/225 |

(Continued)

FOREIGN PATENT DOCUMENTS

| | | | |
|---|---|---|---|
| DE | 2426748 | A1 | 12/1975 |
| DE | 102013220557 | A1 * | 4/2015 ........... B60N 2/4415 |

(Continued)

OTHER PUBLICATIONS

Search Report mailed Jun. 29, 2022, issued in corresponding European Application No. 21217231.6, filed Dec. 23, 2021, 12 pages.

(Continued)

*Primary Examiner* — Matthew W Jellett
(74) *Attorney, Agent, or Firm* — Christensen O'Connor Johnson Kindness PLLC

(57) ABSTRACT

A fluid valve having a magnetic drive unit for a valve closing body is provided. The drive unit can include a core, a coil partially surrounding the core, and an armature movable by the energization of the coil and the resulting magnetic force, wherein a bearing portion can be provided at the armature, which bearing portion comprises a bearing area, by which the armature is pivotably mounted on a main body of the drive unit.

12 Claims, 2 Drawing Sheets

(56) References Cited

U.S. PATENT DOCUMENTS

| | | | | |
|---|---|---|---|---|
| 2002/0134957 A1* | 9/2002 | Paessler | ............ | F16K 31/0682 |
| | | | | 251/129.15 |
| 2008/0149192 A1 | 6/2008 | Holec et al. | | |
| 2009/0314975 A1 | 12/2009 | Scheibe | | |

FOREIGN PATENT DOCUMENTS

| | | | | |
|---|---|---|---|---|
| DE | 102014005498 A1 | 10/2015 | | |
| DE | 102014005498 B4 * | 3/2023 | ......... | F16K 31/0682 |
| JP | H0320405 A | 1/1991 | | |
| JP | 2009535008 A | 9/2009 | | |
| JP | 2016044708 A | 4/2016 | | |
| WO | 2007/124826 A1 | 3/2007 | | |

OTHER PUBLICATIONS

Office Action mailed Dec. 21, 2023, in corresponding Japanese application No. 2022-205173, filed Dec. 22, 2022, 23 pages.

* cited by examiner

FLUID VALVE

CROSS-REFERENCE TO RELATED APPLICATION

This application claims priority to European Application Number 21217231.6, filed Dec. 23, 2021, the disclosure of which is hereby incorporated by reference.

FIELD

The present disclosure relates to a fluid valve having a magnetic drive unit by means of which a valve closing body can be moved.

BACKGROUND

Fluid valves having a magnetic drive are already known. In particular, fluid valves are known in which an armature is linearly moved, i.e., shifted, by applying a magnetic field. This linear movement is converted into a pivoting movement of a valve closing body. Depending on the pivoting movement of the valve closing body, a fluid channel in the fluid valve is released or closed.

A major disadvantage of known fluid valves is that—due to the construction of the valve—the force introduced into the armature by the magnetic field of a coil is low so that relatively large currents through the coil are required in order to be able to switch the fluid valve.

SUMMARY

Based on this, an object of the present disclosure is to provide a fluid valve that allows an improved switching behavior with lower switching currents.

This object is achieved by a fluid valve comprising the features of independent claim 1. Embodiments of the fluid valve are the subject matter of the subclaims.

According to one aspect, a fluid valve comprising a magnetic drive unit for a valve closing body is disclosed. The drive unit comprises a core, a coil partially surrounding the core, and an armature movable by the energization of the coil and the resulting magnetic force. A bearing portion is provided at the armature. The bearing portion comprises a bearing area by means of which the armature is pivotably mounted on a main body of the drive unit. The pivotability can be realized in such a way that the armature is pivoted towards the core when the coil is energized and is pivoted away from the core into a rest position when the coil is de-energized. The armature can be spring-loaded so that the rest position is assumed by the effect of the spring force and, in the energized state, the armature is pivoted towards the core against the spring force.

The technical advantage of the fluid valve is that the pivotable mounting of the armature results in an improved switching behavior of the fluid valve since lower switching currents are required compared to a linear shifting of the armature.

According to one exemplary embodiment, the bearing area is a plain bearing area which is provided at an outer surface on the free-end side of the armature and which interacts with a plain bearing mating surface (also denoted as slide bearing surface) of the main body. Thus, a very simple structure of the drive unit is achieved since a slide bearing is obtained by a mere insertion into an armature support of the main body.

According to one exemplary embodiment, the bearing area has a sliding surface of circular arc shape in cross-section. This surface interacts with an inversely shaped plain bearing mating surface provided on the armature support of the main body. As a result, a plain bearing is created between the main body and the armature, which allows the armature to be pivoted while simultaneously manufacturing the fluid valve at low cost.

According to one exemplary embodiment, the core is U-shaped and has a pair of pole faces. The armature is designed to span the pair of pole faces. In some embodiments, pivoting the armature when the coil is energized closes the magnetic circuit. By extending the armature over the pole faces, a high force is applied to the armature, which force is used to move, in particular pivot, the valve closing body.

According to one exemplary embodiment, the armature can be pivoted about a pivot axis that runs parallel to a plane in which the pole faces of the core are arranged. The pivot axis can be located below the pair of pole faces that are arranged one on top of the other as viewed in the direction of the longitudinal axis of the armature. This allows the armature to pivot relative to the plane of the pole faces, thereby closing the magnetic circuit when the coil is energized.

According to one exemplary embodiment, the armature is pivotable relative to the plane in which the pole faces of the core are arranged, namely in such a way that, in the energized state, the armature is pivoted into a first pivot position towards the pole faces and, in the de-energized state, positioned in a second pivot position at which the longitudinal axis of the armature protrudes obliquely from the plane of the pole faces. The pivoting out of the plane can be performed by means of the spring force of a spring which is deformed when the coil is energized. In the first pivot position, the armature can be positioned a small distance, for example less than 1 mm, in particular less than 0.5 mm, away from the pole faces, i.e., there is no direct abutment against the pole faces. In the first pivot position, the magnetic circuit is closed. In the second pivot position, the distance of the armature from the pole faces (in particular from the pole face furthest away) is at most 5 mm, in particular 4 mm, 3 mm or 2 mm, or 1 mm or less, for example 0.8 mm or substantially 0.8 mm. Due to the small stroke of the pivoting movement, a high force introduction into the armature and thus a high actuating force is generated.

According to one exemplary embodiment, the bearing portion has at least one slot-like recess at opposite end regions in each case, into which recess a portion of a spring can be introduced, by means of which the armature is returned in the de-energized state. The spring can be formed, for example, by a flat spring which abuts with its free end which is spaced from the bearing portion, at the armature support of the main body. In this way, the spring loading of the armature can be achieved in a technically simple manner.

According to one exemplary embodiment, the slot-like recesses run obliquely to a longitudinal axis of the armature. This inclined position ensures that the springs are deformed against their spring force when the armature is pivoted towards the pole faces, thereby creating the spring force required to return the armature.

According to one exemplary embodiment, the armature comprises a linking portion for the valve closing body on the side opposite the bearing portion. The linking portion is configured in such a way that the valve closing body is in operative connection with the armature and thus a pivoting of the armature leads to a pivoting of the valve closing body, but the valve closing body itself can also be pivoted relative to the armature. The linking portion can, for example, be hook-shaped in cross-section and form a pivot joint with a free end of the valve closing body.

According to one exemplary embodiment, the linking portion is formed on a projection of the armature provided on a rear side of the armature, the rear side being opposite to an armature front side facing the pole faces of the core. As a result, the linking portion projects from the armature in the direction of a valve housing, into which at least a portion of the valve closing body projects. It is thus possible to achieve a space-saving coupling of the armature to the valve closing body.

According to one exemplary embodiment, the linking portion forms a support for a free end of the valve closing body, the free end of the valve closing body being pivotably held in the linking portion. Thus, a force transmission from the armature to the valve closing body can be achieved with simultaneous pivotability of the armature relative to the valve closing body.

According to one exemplary embodiment, the armature comprises a plurality of armature sheets layered one on top of the other, which are partially surrounded by an armature carrier and are fixed relative to one another. As a result, the armature can be manufactured inexpensively since it has a plurality of punched parts, in particular metal sheets produced by punching, instead of an integral metal part.

According to one exemplary embodiment, the linking portion for the valve closing body and the bearing portion are formed on the armature carrier. In this way, cost-effective manufacture of the armature can be achieved since the armature carrier, which fixes the armature sheets relative to one another, is simultaneously used to mount the armature in the armature support and to couple the armature to the valve closing body.

Alternatively, the armature may comprise an integrally formed metallic armature core instead of the armature sheets. This armature core can also be surrounded by an armature carrier, on which the linking portion for the valve closing body and the bearing portion are provided.

According to one exemplary embodiment, the armature carrier is an injection-molded part. As a result, the fixing of the armature sheets, respectively, the formation of the bearing portion and the linking portion can be obtained by an injection molding process so that the manufacturing costs of the armature are reduced.

According to one exemplary embodiment, the pivotability of the armature is limited by the pivot region of the valve closing body in the valve housing in both the energized and de-energized states of the magnetic drive unit. In other words, the pivoting movement of the armature is not limited by the armature abutting against surrounding components of the fluid valve, but the armature is indirectly limited in its pivotability by the valve closing body. As a result, it is not necessary to adjust the pivot travel of the armature, which reduces the manufacturing costs of the fluid valve.

In the sense of the present disclosure, the expressions "approximately", "substantially," or "about" mean deviations from the respective exact value by +/−5-10% and/or deviations in the form of changes that are insignificant for the function.

Further embodiments, advantages and possible applications of the present disclosure also result from the following description of exemplary embodiments and from the drawings. In this connection, all the features described and/or illustrated are in principle the subject matter of the present disclosure, either individually or in any combination, irrespective of their summary in the claims or their back-reference. Also, the contents of the claims are made a part of the description.

BRIEF DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

Figure 1:
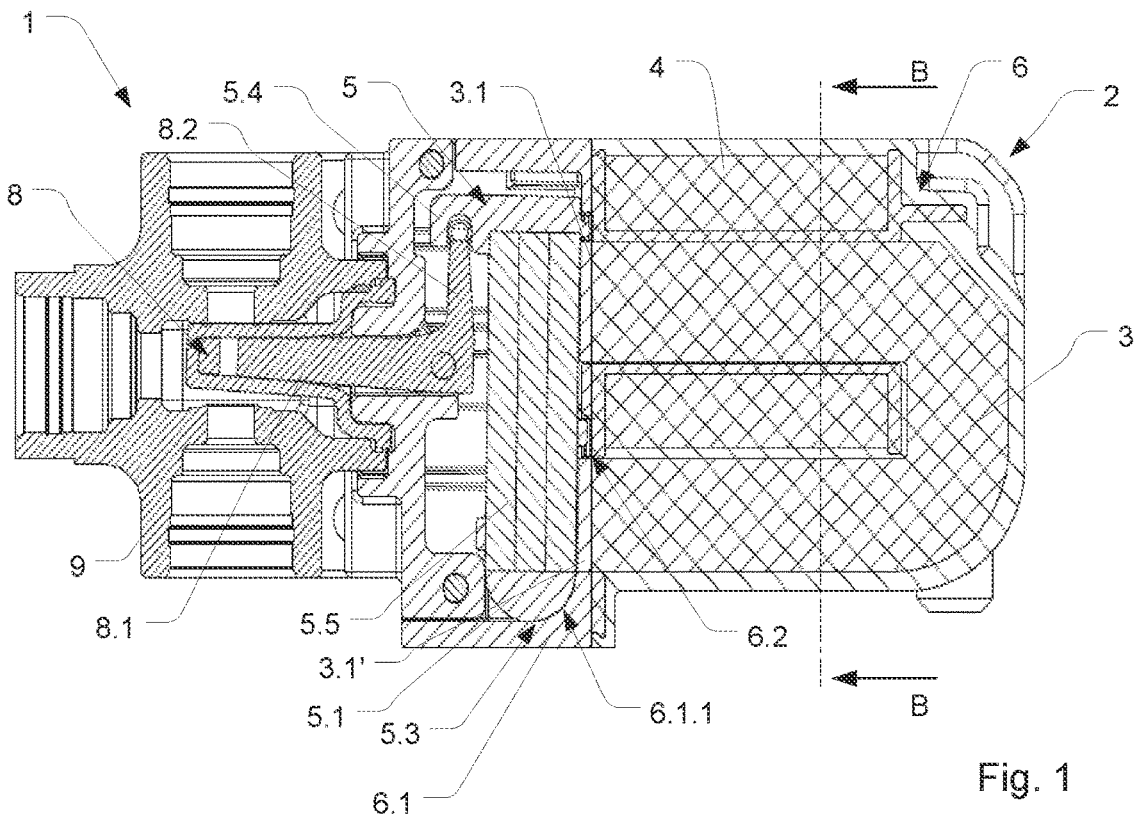
FIG. 1 shows a longitudinal section through a fluid valve by way of example.

FIG. 1 illustrates by way of example and schematically a longitudinal sectional view through the center of the fluid valve 1.

The fluid valve 1 comprises a drive unit 2 for a valve closing body 8 and a valve housing 9, in which at least one fluid channel is provided. The valve closing body 8 extends into the valve housing 9 and is coupled to the drive unit 2 in such a way that the valve closing body 8 can be moved, in particular pivoted, by the drive unit 2. In particular, the valve closing body 8 can assume a first and a second pivot position in order to release or close a valve opening depending on the pivot position. In the illustrated exemplary embodiment, the valve housing 9 has three ports, one pair of ports being fluidly connected to one another in each case depending on the pivot position of the valve closing body 8. Deviating therefrom, however, the fluid valve 1 can also have only two ports, a fluidic connection between the ports being released or not depending on the pivot position of the valve closing body 8.

The fluid valve 1 has the following functionality: the drive unit 2 is configured to influence the pivot position of an armature 5. The drive unit 2 is an electromagnetic drive unit, i.e., when a coil 4 of the drive unit 2 is energized, a magnetic force is generated by means of which the armature 5 is moved from a second pivot position to a first pivot position. This first pivot position is shown in FIG. 1. This first pivot position is held as long as the coil 4 is energized. The armature 5 can be spring-loaded by means of a spring 7 in such a way that it is returned to the second pivot position after the flow of electric current through the coil 4 has ended.

As shown in FIG. 1, the valve closing body 8 is coupled to the armature 5 in such a way that the valve closing body 8 is moved, in particular pivoted, by the armature 5. In particular, the valve closing body 8 assumes a first or second position in the valve housing 9 depending on the pivot position of the armature 5 and thus defines the valve position or the release or closing of a fluid channel.

The structure of the armature 5 and its interaction with the other functional elements of the drive unit 2 of the fluid valve 1 are described in more detail below.

The drive unit 2 comprises a main body 6. The main body 6 forms the supporting basic structure of the drive unit 2. It can be designed as an injection-molded part, in particular as a plastics injection-molded part. The main body 6 has a tubular or substantially tubular support for the coil 4. A first insertion opening is formed within the support, into which a leg of a U-shaped core 3 can be inserted.

The main body 6 further comprises an armature support 6.1. This armature support 6.1 directly adjoins the support of the coil 4 and is designed to pivotably mount the armature 5. The armature support 6.1 is of box-like, in particular of rectangular box-like design and has a bottom region and a plurality of wall regions. The wall regions are connected to the bottom region, surround the bottom region circumferentially and project from the bottom region to a side facing away from the coil 4.

A second insertion opening is provided in the bottom region, into which opening a second leg of a U-shaped core 3 is insertable. The U-shaped core 3 is thus yoke-shaped, a leg of the core being surrounded by the coil 4 so that, when the coil 4 is energized, a closed magnetic circuit is formed by the core 3 and the armature 5 spanning the pole faces 3.1, 3.1' of the core 3.

The core 3 can, for example, be formed from a plurality of layered flat material pieces. The flat material pieces are, in particular, punched parts made from a metallic flat material, in particular a metal sheet. In order to form the core 3, they are placed with their flat sides on top of one another in congruent fashion so that a stack with a plurality of flat material pieces is created, which in this arrangement forms the core 3 (so-called layered core). The individual flat material pieces are here in direct and electrically conductive abutment against one another so that the layered core has the same or substantially the same electrical properties as a core formed in one piece. As a result, the costs for manufacturing the core 3 can be substantially reduced.

Figure 2:
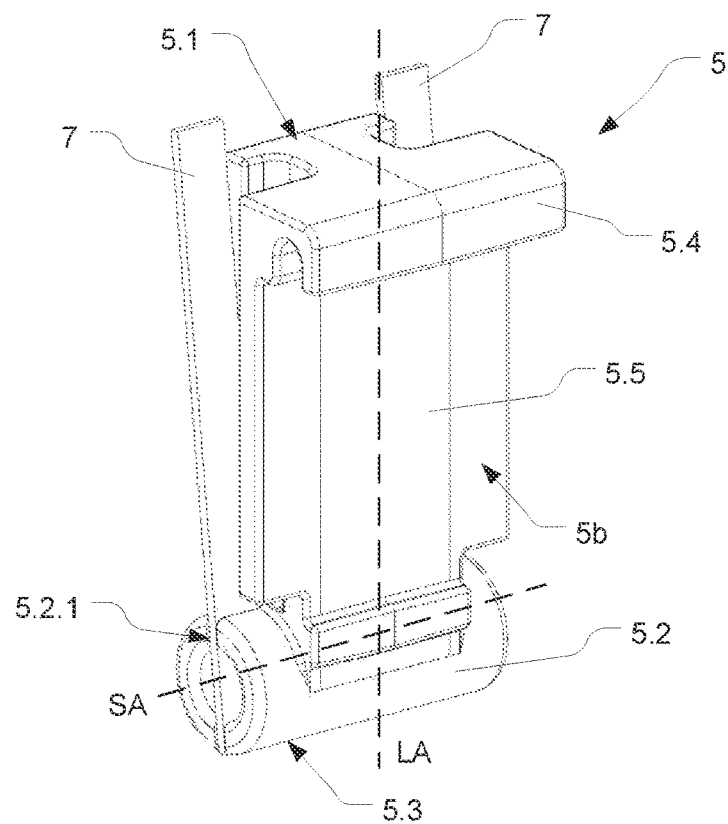
FIG. 2 shows a first perspective view of an armature by way of example.
Figure 3:
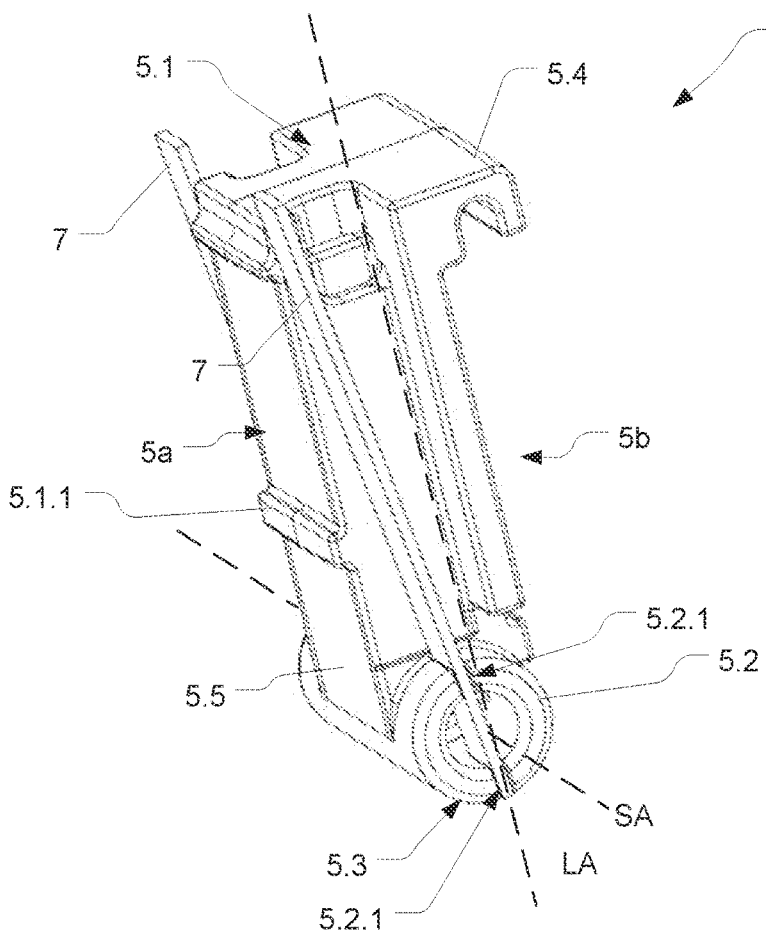
FIG. 3 shows a second perspective view of an armature by way of example.
Figure 4:
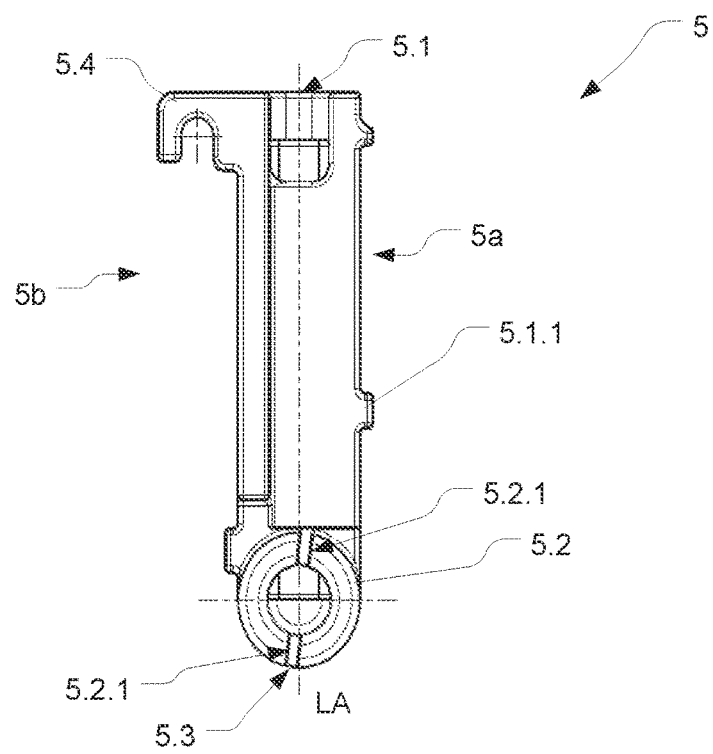
FIG. 4 shows a side view of an armature by way of example.

FIGS. 2 to 4 respectively show the armature 5 in a stand-alone position.

A bearing portion 5.2 is provided on the armature 5. The bearing portion 5.2 has a bearing area 5.3, by means of which the armature 5 rests pivotably in the main body 6 of the drive unit 2. Due to the pivotable mounting of the armature 5, the armature 5 can assume the above described pivot positions, namely in particular a second pivot position in which the armature 5 is pivoted out of a plane extending parallel to the pole faces 3.1, 3.1', and a first pivot position in which a longitudinal axis of the armature 5 extends parallel to a plane in which the pole faces 3.1, 3.1' of the core 3 are located.

The bearing portion 5.2 is provided at a first free end of the armature 5. The bearing area 5.3 provided at the bearing portion 5.2 can form a plain bearing area formed externally on the bearing portion 5.2. The bearing area 5.3 interacts with a plain bearing mating surface 6.1.1 provided on the main body 6. The bearing portion 5.2 is inserted into the armature support 6.1 of the main body 6 in such a way that a surface bearing is formed between the bearing portion 5.2 and the armature support 6.1, i.e., the bearing area 5.3 abuts against the plain bearing mating surface 6.1.1, as a result of which the pivotable mounting of the armature 5 is achieved.

The bearing area 5.3 of the bearing portion 5.2 has the shape of a circular arc in cross-section on the outer circumference, i.e., forms a curved sliding surface. The bearing area 5.3 is interlockingly connected to the concave plain bearing mating surface 6.1.1 of the armature support 6.1, which is shaped inversely to the bearing area 5.3. As a result, the armature 5 can be pivoted about a pivot axis SA which runs parallel to a plane in which the pole faces 3.1, 3.1' of the core 3 are arranged, or which (pivot axis SA) runs perpendicularly to the longitudinal axis LA of the armature 5. This allows the armature 5 to be pivoted towards or away from the upper pole face 3.1 shown in FIG. 1.

A linking portion 5.4 is provided on the side of the armature 5 opposite the bearing portion 5.2. The armature 5 is coupled to the valve closing body 8 via this linking portion 5.4. The linking portion 5.4 has, for example, a recess in which a portion, in particular a free-end side portion, of the valve closing body 8 engages. An inverse design is also conceivable in principle, i.e., that the valve closing body 8 has a recess in which a projection of the linking portion 5.4 engages. The coupling between the armature 5 and the valve closing body 8 via the linking portion 5.4 is designed in particular in such a way that the linking portion 5.4 allows the valve closing body 8 to be pivoted relative to the armature 5. In the illustrated exemplary embodiment, this is achieved by means of a pivot joint-like coupling between the armature 5 and the valve closing body 8.

The linking portion 5.4 is provided, for example, on a hook-shaped projection of the armature 5, which projects from a rear side 5b of the armature 5. The rear side 5b is located opposite the front side 5a of the armature 5, which faces the pole faces 3.1, 3.1' of the core 3. It is thus possible to achieve a space-saving coupling of the armature 5 to the valve closing body 8.

The valve closing body 8 can be of angular design and has a first and second leg 8.1, 8.2. The longitudinal axes of the legs 8.1, 8.2 enclose, for example, an angle between 80° and 100° with each other. In particular, the angle between the longitudinal axes of the legs 8.1, 8.2 is 90° or substantially 90°. In this case, the first leg 8.1 extends into the valve housing and the second leg 8.2 runs substantially parallel to the longitudinal axis LA of the armature 5. The free end of the second leg 8.2 is coupled to the armature 5 via the linking portion 5.4 in order to establish the mechanical connection between the armature 5 and the valve closing body 8. In some embodiments, the valve closing body 8 is coupled directly, i.e., without further intermediate elements, to the armature 5 by means of the second leg 8.2.

In particular, the armature 5 comprises an armature carrier 5.1. This armature carrier 5.1 accommodates a metallic part of the armature 5, which functions for magnetic coupling between the pole faces. In particular, portions of the armature carrier 5.1 form the bearing portion 5.2 and the linking portion 5.4.

For example, as shown in FIG. 1, the armature 5 has a plurality of flat material pieces which are arranged in layers and which are referred to hereinafter as armature sheets 5.5. The armature sheets 5.5 are in particular punched parts made of a metallic flat material, in particular a metal sheet. In order to form the armature 5, the sheets are placed congruently with their flat sides one on top of the other so as to create a stack with a plurality of armature sheets 5.5 (so-called layered armature). The individual armature sheets 5.5 are here in direct and electrically conductive abutment against one another so that the layered armature 5 has the same or substantially the same electrical properties as an armature core formed in one piece. As a result, the cost for manufacturing the armature 5 can be substantially reduced.

The armature sheets 5.5 are partially enclosed by the armature carrier 5.1 and, as a result, are fixed relative to one another. In other words, the armature carrier 5.1 is thus used as a support for the armature sheets 5.5. The armature carrier 5.1 can be designed as a plastics injection molded part. The armature sheets 5.5 are, for example, inserted into an injection molding tool and are then partially overmolded with a plastic material by means of an injection-molding method. In this way, a cost-effective production of the armature 5 can be achieved.

As can be seen in FIGS. 2 to 4, the armature carrier 5.1 has at least one holding portion 5.1.1 for the armature sheets 5.5 on the front side of the armature 5 facing the pole faces 3.1, 3.1' of the core 3. This holding portion 5.1.1 extends transversely to the longitudinal axis LA of the armature 5 along the armature sheets 5.5 and thereby fixes them. The holding portion 5.1.1 can be of strip-like design and is provided in a central region of the armature 5, so that the holding portion 5.1.1 comes to lie between the pole faces 5.1, 5.1'. In some embodiments, a recess interacting with the at least one holding portion 5.1.1 is provided in the main body 6 of the drive unit 2, into which recess the holding portion 5.1.1 can be inserted when the magnetic drive unit 2 is energized.

In the bearing portion 5.2, for example, recesses 5.2.1 of slot-like design are provided. In particular, one recess 5.2.1 is provided on each of the two opposite sides of the bearing portion 5.2 (viewed along the pivot axis SA). Each of these recesses 5.2.1 is designed to receive a free end of a spring 7, which is used to return the armature 5 to the first pivot position, which the armature 5 assumes in the de-energized state.

As shown in FIGS. 2 and 3, the spring 7 is designed as a flat spring. It is fixed by a free end in the recess 5.2.1 and projects upwards from the bearing portion 5.2. In particular, the spring 7 has a length equal to or substantially equal to the armature 5. In some embodiments, a pair of springs 7 is provided that are arranged on the two opposite sides of the bearing portion 5.2 (seen along the pivot axis SA). In this way, a uniform introduction of force into the armature 5 is achieved.

As can be seen in particular in FIG. 4, a pair of recesses 5.2.1 is provided on each side. The recesses 5.2.1 here have a slot-like design and are diametrically opposite one another so that the flat spring can be inserted into the pair of recesses 5.2.1. The recesses 5.2.1 are here arranged to extend obliquely relative to the longitudinal axis LA of the armature 5 so that the longitudinal axis of the spring 7 also extends obliquely relative to the longitudinal axis LA of the armature 5 and is inclined in the direction of the plane spanning the front side 5a of the armature 5. Due to this oblique arrangement of the springs 7, they are deformed during the energization of the coil 4 and the associated pivoting of the armature 5 toward the pole faces 3.1, 3.1' of the core 3 against their spring force. The spring force resulting from this deformation causes the armature 5 to pivot back to its first pivot position, i.e., away from the pole face 3.1, after the current flow through the coil 4 has ended.

As explained above, the armature carrier 5.1 and thus also the bearing portion 5.2 are manufactured with the recesses 5.2.1 in an injection molding process. In some embodiments, the injection molding tool has an adjustment device by means of which it is possible to vary the inclined position of projections in the injection molding tool, by means of which the recesses 5.2.1 are produced. Depending on the inclined position of the recess 5.2.1, the restoring force of the armature 5 can be changed despite the use of the same springs 7 so that the drive unit 2 can be used in the case of fluid valves 1 requiring different restoring forces even when identically dimensioned springs 7 are used.

In some embodiment, the armature 5 is held in the armature support 6.1 without a stop, i.e., the pivoting movement of the armature 5 is not limited in either the first or the second pivoting position by an armature portion abutting against components surrounding the armature 5. The limitation of the pivoting movement of the armature 5 is rather caused by the valve closing body 8, which comes into abutment against contact surfaces in the valve housing 9 depending on the pivot position of the armature 5. The abutment surfaces can in particular be valve seats formed in the valve housing 9. It should be noted that also in the second pivot position of the armature 5, which is assumed when current flows through the coil 4, the armature 5, in particular the armature sheets 5.5, is/are spaced apart from the pole surfaces 3.1, 3.1'. The distance can be less than 1 mm, and in particular less than 0.5 mm, in order to achieve the highest possible force introduction into the armature 5.

The present disclosure has been described above by means of exemplary embodiments. It is understood that numerous variations and modifications are possible without departing from the scope of protection defined by the claims.

LIST OF REFERENCE SIGNS

1 fluid valve
2 drive unit
3 core
3.1, 3.1' pole face
4 coil
5 armature
5a front side of the armature
5b rear side of the armature
5.1 armature carrier
5.1.1 holding portion
5.2 bearing portion
5.2.1 recess
5.3 bearing area
5.4 linking portion
5.5 armature sheet
6 main body
6.1 armature support
6.1.1 plain bearing mating surface
6.2 recess
7 spring
8 valve closing body
8.1 first leg
8.2 second leg
9 valve housing
LA longitudinal axis of the armature
SA pivot axis of the armature In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A fluid valve, comprising:
    a magnetic drive unit for a valve closing body, the magnetic drive unit including:
        a core;
        a coil partially surrounding the core; and
        an armature which can be moved by the energization of the coil and a resulting magnetic force thereof,
    wherein a bearing portion is provided at the armature, which has a bearing area by which the armature is pivotably mounted on a main body of the drive unit,
    wherein the armature has a linking portion for the valve closing body on a side opposite the bearing portion,
    wherein the linking portion is formed on a projection of the armature provided on a rear side of the armature, the rear side facing a front side of the armature, which front side faces pole faces of the core, and
    wherein the linking portion forms a support for a free end of the valve closing body, the free end of the valve closing body being held pivotably in the linking portion.

2. The fluid valve of claim 1, wherein the bearing area is a plain bearing area which is provided at an outer surface at a free-end side of the armature and which interacts with a plain bearing mating surface of the main body.

3. The fluid valve of claim 2, wherein the bearing area has a sliding surface of circular arc shape in cross-section.

4. The fluid valve of claim 1, wherein the core is U-shaped and has a pair of pole faces, and wherein the armature spans the pair of pole faces.

5. The fluid valve of claim 4, wherein the armature is pivotable about a pivot axis which is parallel to a plane in which the pair of pole faces of the core are arranged.

6. The fluid valve of claim 4, wherein the armature can be pivoted relative to a plane in which the pole faces of the core are arranged such that, in an energized state of the coil, the armature is pivoted into a first pivot position towards the pair of pole faces and, in a de-energized state of the coil, the armature is positioned in a second pivot position in which a longitudinal axis of the armature projects obliquely from the plane of the pair of pole faces.

7. The fluid valve of claim 1, wherein the bearing portion has at opposite end regions in each case a slot-like recess into which a portion of a spring can be inserted, by which the return of the armature is carried out in the de-energized state.

8. The fluid valve of claim 7, wherein the slot-like recesses run obliquely to a longitudinal axis of the armature.

9. The fluid valve of claim 1, wherein the armature comprises a plurality of armature sheets layered one on top of the other, which are partially surrounded by an armature carrier and are fixed relative to one another.

10. The fluid valve of claim 9, wherein the armature has a linking portion for the valve closing body on a side opposite the bearing portion, and wherein the linking portion is formed on the armature carrier.

11. The fluid valve of claim 9, wherein the armature carrier is formed as an injection-molded part.

12. The fluid valve of claim 1, wherein the pivotability of the armature is limited by a pivot region of the valve closing body in a valve housing in both an energized state and a de-energized state of the magnetic drive unit.

* * * * *